US009869340B2

(12) United States Patent
Shipman (10) Patent No.: US 9,869,340 B2
(45) Date of Patent: Jan. 16, 2018

(54) CONTROL CABLE ACTUATION DEVICE (75) Inventor: Christopher Shipman, Chicago, IL (US)

(73) Assignee: SRAM, LLC, Chicago, IL (US)

(*) Notice: Subject to any disclaimer, the term of this patent is extended or adjusted under 35 U.S.C. 154(b) by 1027 days.

(21) Appl. No.: 12/552,234

(22) Filed: Sep. 1, 2009

(65) Prior Publication Data
US 2011/0048161 A1 Mar. 3, 2011

(51) Int. Cl.
F16C 1/22 (2006.01)
F16C 1/16 (2006.01)
B62K 23/06 (2006.01)
B62L 3/02 (2006.01)

(52) U.S. Cl.
CPC .............. F16C 1/16 (2013.01); B62K 23/06 (2013.01); B62L 3/02 (2013.01); F16C 1/22 (2013.01); F16C 2326/20 (2013.01); F16C 2326/28 (2013.01); Y10T 74/20438 (2015.01)

(58) Field of Classification Search
CPC .......... B62K 23/04; B62K 23/06; B62M 3/02; G16C 1/22; G16C 1/223; G16C 1/226; G16C 1/23; G16C 1/10; B62L 3/02; B62L 3/026; F16C 1/22; F16C 1/223; F16C 1/226
USPC ............. 74/488, 489, 502.2, 473.14, 473.15, 74/501.6, 501.5 R, 500.5, 502.4–502.6; 188/24.11, 24.19, 24.22, 196 R, 196 M; 55/488, 489, 502.2, 473.14, 473.15, 55/501.6, 501.5 R, 500.5, 502.4–502.6
See application file for complete search history.

(56) References Cited

U.S. PATENT DOCUMENTS

| | | | | |
|---|---|---|---|---|
| 584,635 A | * | 6/1897 | Hart | 74/489 |
| 591,994 A | * | 10/1897 | Warren | 74/489 |
| 1,019,304 A | * | 3/1912 | Chubbuck | 74/489 |
| 2,048,398 A | * | 7/1936 | Lasker | 74/502.4 |
| 4,066,147 A | * | 1/1978 | Toyomoto | B62L 1/12 184/15.1 |
| 4,459,871 A | * | 7/1984 | Shimano | B62L 3/02 74/480 R |
| 4,833,937 A | | 5/1989 | Nagano | |
| 5,572,907 A | * | 11/1996 | Kaakinen | 74/489 |
| 5,678,455 A | * | 10/1997 | Watarai | 74/473.3 |

(Continued)

FOREIGN PATENT DOCUMENTS

| EP | 35372 A2 | * | 9/1981 |
|---|---|---|---|
| EP | 0 916 570 A2 | | 5/1999 |

(Continued)

Primary Examiner — Daniel D Yabut (57) ABSTRACT

A control cable actuation device designed to be attached to a handlebar-steered vehicle frame member for a cable assembly including a control cable slidably disposed within a control cable housing. The actuation device includes a cable adjuster attachable to the frame member and an actuation lever configured to displace one end of the control cable. The cable adjuster is configured to receive the control cable and to axially displace to slidably displace the cable within the cable housing under cable adjustment. The lever is rotatably attached to the cable adjuster about a first axis to slidably displace the cable within the cable housing under cable actuation. The lever is also configured to rotate about a second axis to axially displace the cable adjuster to slidably displace the cable within the cable housing under cable adjustment.

26 Claims, 5 Drawing Sheets (56) References Cited

U.S. PATENT DOCUMENTS

| | | | |
|---|---|---|---|
| 5,799,544 A | 9/1998 | Oda | |
| 5,946,978 A * | 9/1999 | Yamashita | 74/502.2 |
| 5,966,993 A * | 10/1999 | Ekins | 74/502.2 |
| 6,431,326 B1 * | 8/2002 | Takizawa | 74/489 |
| 8,033,198 B2 * | 10/2011 | Chiang | 74/502.2 |
| 8,056,439 B2 * | 11/2011 | Fukui et al. | 74/502.2 |
| 2006/0266594 A1 * | 11/2006 | Tsai | 74/502.2 |

FOREIGN PATENT DOCUMENTS

| | | | | |
|---|---|---|---|---|
| FR | 388644 A * | 8/1908 | | B62L 3/02 |
| FR | 793284 A * | 1/1936 | | B62L 3/02 |
| FR | 884159 A * | 8/1943 | | B62L 3/02 |
| GB | 397583 A * | 8/1933 | | |
| GB | 520390 A * | 4/1940 | | B62L 3/02 |

* cited by examiner

CONTROL CABLE ACTUATION DEVICE

BACKGROUND OF THE INVENTION

This invention relates in general to control cable actuation devices, and more particularly, to actuation devices including an adjustment device for Bowden-type (cable within a housing) control cables for bicycles or similar handlebar-steered vehicles.

Conventionally, a bicycle control cable assembly, including a control cable partially encased by a cable housing, is interposed between an operating mechanism such as a bicycle brake, derailleur or internal gear hub, and an actuation device such as a shifter or brake lever. In a bicycle derailleur, the control cable links the shifter to a derailleur having a chain guide for switching a drive chain laterally between sprockets of a multistage sprocket assembly. Derailleur shifters are generally available in two varieties: conventional pivoting levers and rotational twistshifters. Derailleur shifters are manually actuated to laterally displace the chain guide and in turn the drive chain to the desired sprocket. Repeated shifting, however, tends to both compress the cable housing and stretch out the control cable resulting in a change in relative length or slack between the control wire and the cable sheath. This slack in the control cable may cause the chain guide to urge the drive chain into a "rasping" zone between sprockets or may even result in undesired shifts.

In a conventional brake actuation device, a brake lever is pivotally mounted to a base member attached to a bicycle handlebar and a control cable extends from the brake lever to the brake mechanism. The brake pivots between an actuated position whereby the brake shoes engage the wheel rim, and an unactuated position whereby the brake lever is released to space apart the brake shoes from the wheel rim. This spacing is conventionally adjusted by a cable adjustment device, commonly a "barrel adjuster," threadably connected to the base member and configured to engage the cable housing to change the effective length of the cable between the lever and the brake mechanism. Slack in brake control cables widens the spacing or gap between the brake shoes and the wheel rim thereby requiring greater brake lever deflection to initiate braking and will generally alter the brake "feel." This may result in a potentially hazardous situation whereby a rider accustomed to brake shoe contact after deflecting the brake lever a given distance may overcompensate and unintentionally lock the brakes, inducing a skid. It is therefore desirable to incorporate an adjustment device into a control cable system to eliminate excessive cable slack and precisely tune shifting and braking devices.

Conventionally, a barrel adjuster and a brake lever are separately attached to the base member which is in turn attached to the bicycle handlebar. The brake lever is rotatable about a first axis to actuate the braking mechanism to displace the brake shoes against the wheel rim to slow the bicycle. The barrel adjuster is separately rotatable about a second axis to adjust the gap between the brake shoes and the wheel rim in the unactuated position of the braking device. It is therefore desirable to provide an actuation lever that is rotatable about a first axis to actuate the operating mechanism, in the case of a brake mechanism to displace and urge the brake shoes against the wheel rim to slow the bicycle, and rotatable about a $2^{nd}$ axis to adjust the effective cable length, in the case of a brake mechanism to adjust the gap between the brake shoes and the wheel rim in the unactuated position.

SUMMARY OF THE INVENTION

The present invention provides a control cable actuation device attachable to a handlebar-steered vehicle frame member for a cable assembly including a control cable slidably disposed within a control cable housing. The actuation device includes a cable adjuster attachable to the frame member and an actuation lever configured to displace one end of the control cable. The cable adjuster is configured to receive the control cable and to axially displace to slidably displace the cable within the cable housing under cable adjustment. The lever is rotatably attached to the cable adjuster about a first axis to slidably displace the cable within the cable housing under cable actuation. The lever is also configured to rotate about a second axis to axially displace the cable adjuster to slidably displace the cable within the cable housing under cable adjustment.

In one embodiment of the present invention, the cable adjuster axially displaces upon rotation about the second axis. The actuation lever rotates the cable adjuster about the second axis to slidably displace the cable within the cable housing under cable adjustment. The cable adjuster is rotatably attachable about the second axis to an end of a handlebar. The second axis is an axis of the handlebar and the cable adjuster is configured to axially displace along the second axis upon rotation of the cable adjuster. The control cable and control cable housing are disposed substantially coaxially within the handlebar.

In another embodiment of the present invention, the cable adjuster is threadably attachable to the frame member to be axially displaceable and configured to receive the control cable therethrough. The actuation lever includes a cable end cradle disposed distally from the first axis for attachment of the one end of the control cable thereto.

In another embodiment of the present invention, the control cable actuation device actuates a brake device and the actuation lever is a brake lever that includes a finger grip disposed in pivoting arrangement with the cable end cradle and the first axis. The lever is rotatable in 360-degree increments about the second axis under cable adjustment from a lever home position.

In another embodiment of the present invention, the cable adjuster includes an adjuster housing rotatably attachable to the frame member about the second axis and an adjuster bolt rotatably fixed to the adjuster housing. The adjuster bolt is configured to axially displace upon rotation of the adjuster housing about the second axis. The adjuster housing and adjuster bolt are configured to receive the control cable. The adjuster bolt is threadably attachable to the frame member to be axially displaceable. The adjuster housing and adjuster bolt are configured to receive the control cable therethrough.

In another embodiment of the present invention, the control cable actuation further includes a mounting assembly fixedly attachable to the frame member and configured to receive the control cable and the control cable housing. The cable adjuster is attached to the mounting assembly to be axially displaceable to slidably displace the cable within the cable housing under cable adjustment. The mounting assembly is attachable to an end of a handlebar. The cable adjuster may be threadably attached to the mounting assembly to be axially displaceable along the second axis and configured to receive the control cable therethrough. The mounting assembly includes a base member abutting the end of the handlebar, a mounting bolt axially coupled to the base member, and a locking element configured to be radially displaced to secure the mounting assembly to the handlebar as the mounting bolt is axially coupled to the base member.

The mounting assembly is disposed substantially within the handlebar. The mounting bolt is threadably connected to the base member and the locking element is configured to be wedgeably displaced by the base member and mounting bolt. The cable adjuster is threadably connected to one of the base member and the mounting bolt.

These and other features and advantages of the invention will be more fully understood from the following description of certain embodiments of the invention, taken together with the accompanying drawings.

DETAILED DESCRIPTION

Figure 1:
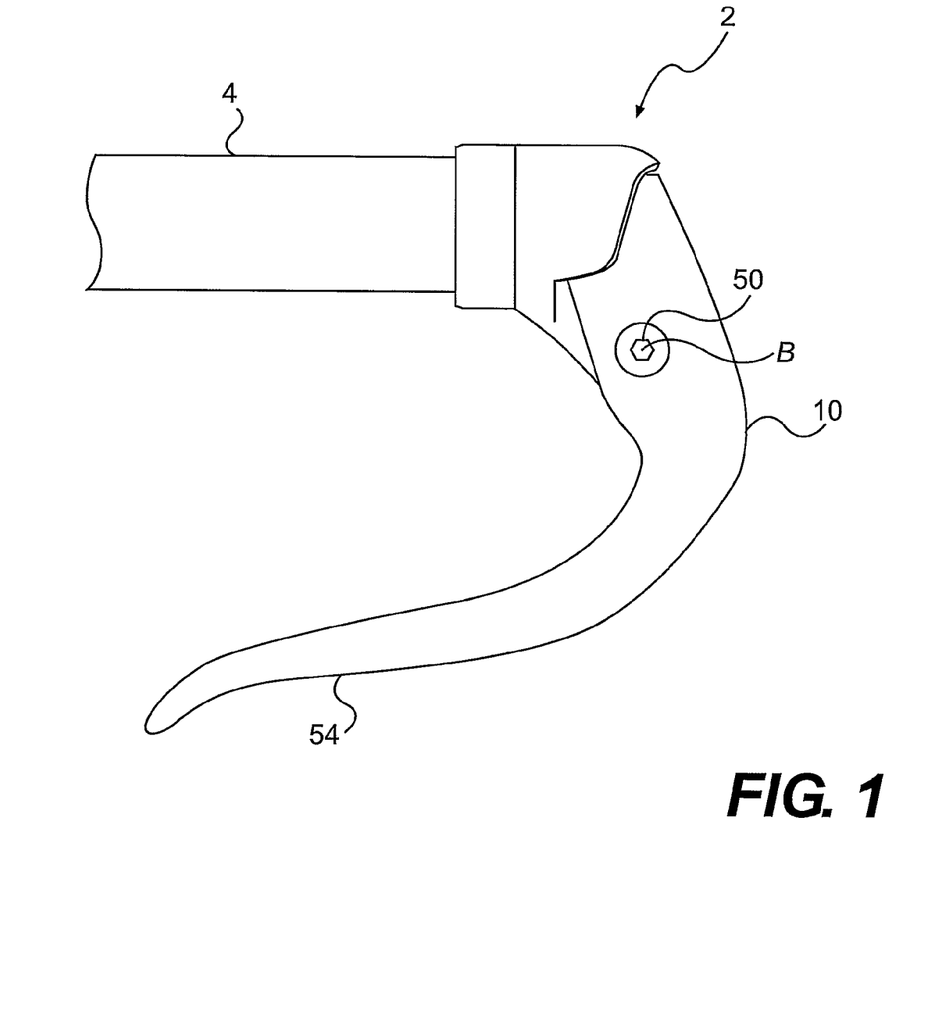
FIG. 1 is a side view of a control cable actuation device according to one embodiment of the present invention attached to a bicycle handlebar.
Figure 2:
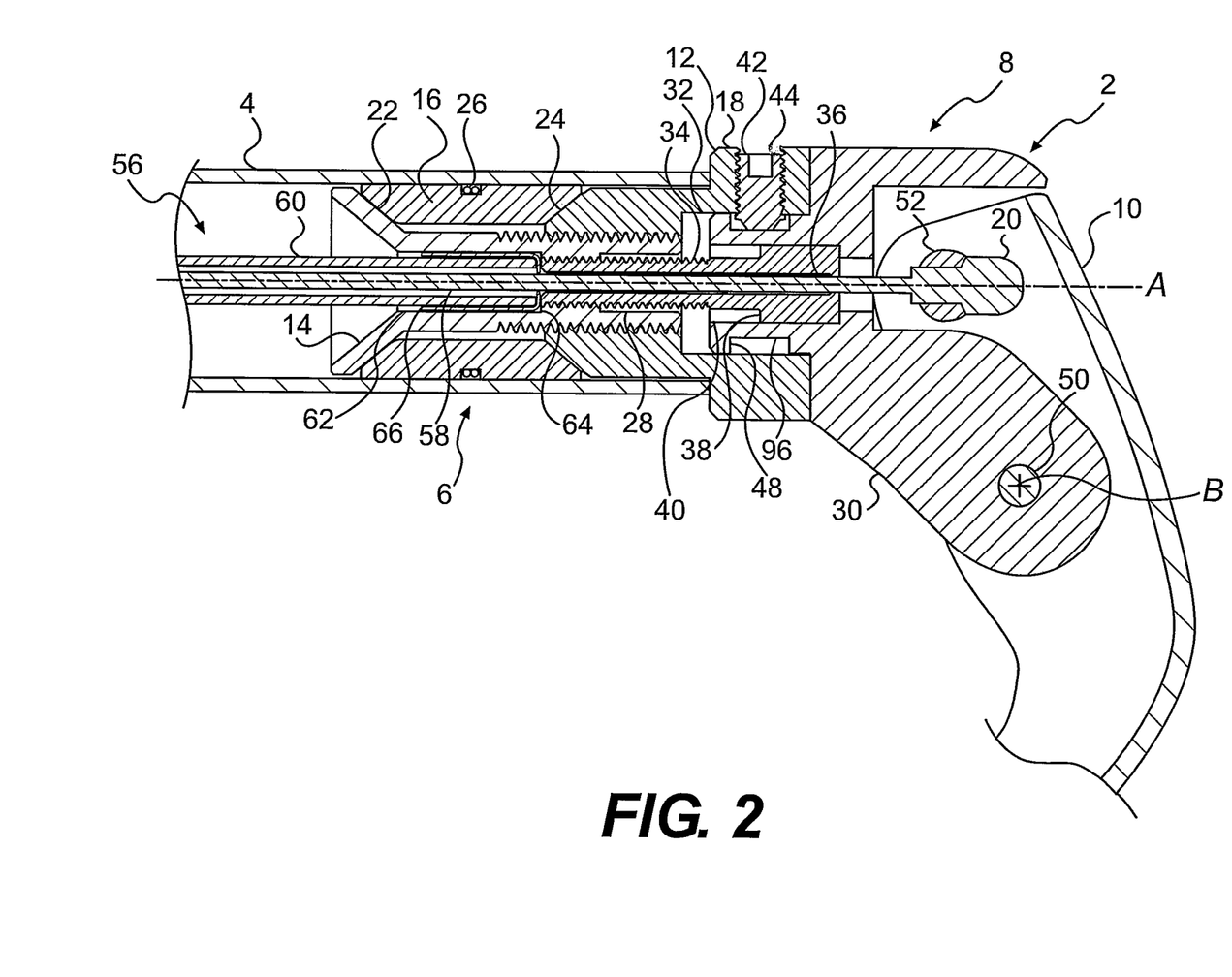
FIGS. 2 and 3 are cross-sectional views of the control cable actuation device of FIG. 1 in different cable adjustment positions.
Figure 3:
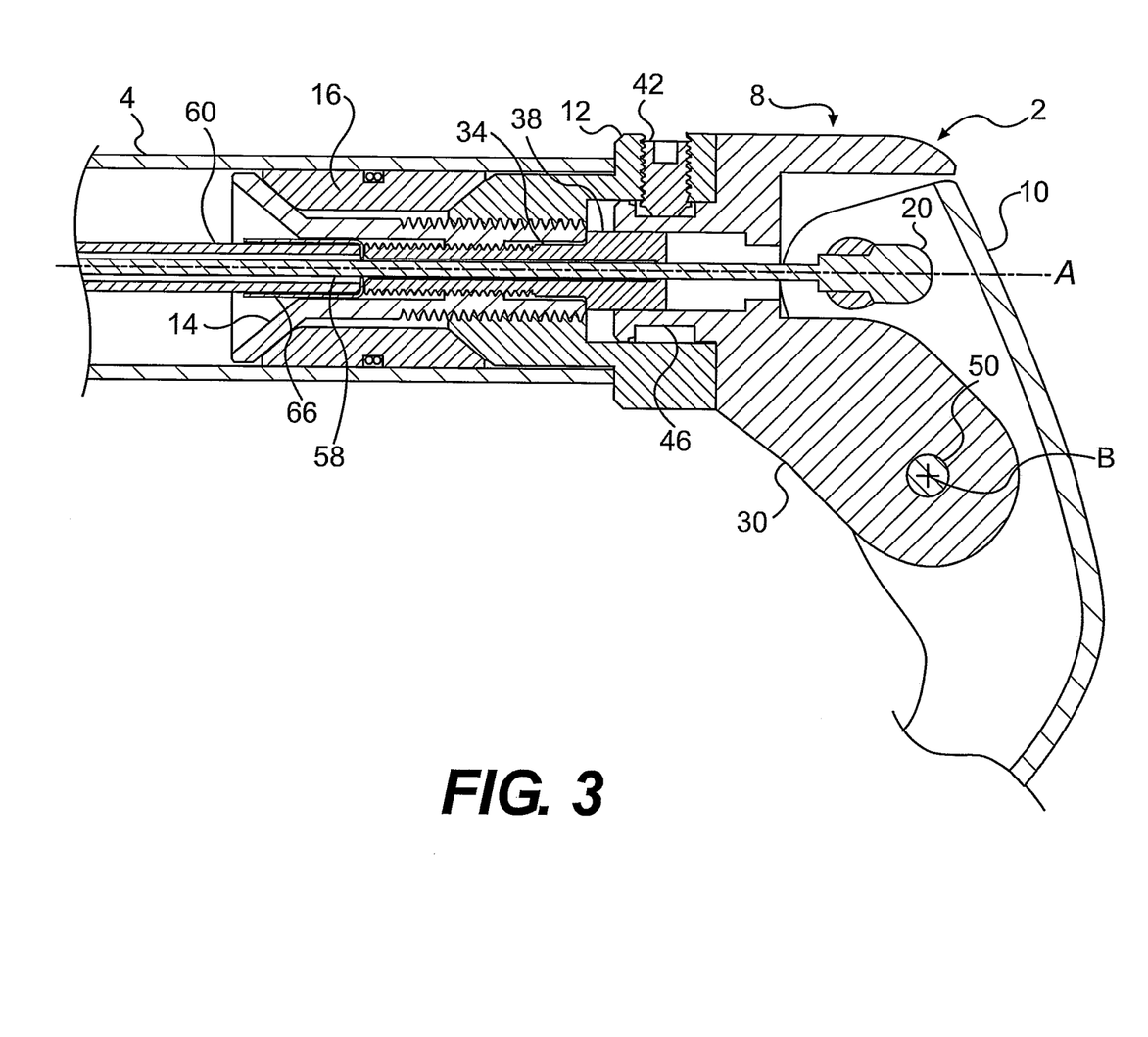

FIGS. 1-3 illustrate a control cable actuation device according to the invention, in this embodiment, a brake lever assembly 2 attached to an end of a bicycle handlebar 4. FIG. 2 is a cross-sectional view of the lever assembly 2 shown in FIG. 1 including a mounting assembly 6 fixedly attached to the handlebar 4, a cable adjuster 8 axially and rotatably attached to the mounting assembly 6, and an actuation lever 10, in this embodiment a brake lever 10, rotatably attached to the cable adjuster 8 about an axis B.

In FIGS. 1-3, the mounting assembly 6 includes a base member 12 fixedly attached to the handlebar 4, a mounting bolt 14 threadably connected to the base member 12, and a locking element 16 operably disposed between the mounting bolt 14 and the base member 12 to be displaceably secured to the handlebar 4, in this embodiment, to an inner surface of the handlebar. In this embodiment, the mounting assembly 6 is attached coaxially to the end of and substantially within the handlebar 4. Base member 12 includes a flange 18 that abuts the end of the handlebar 4 when attached to the handlebar. The mounting bolt 14 is threadably connected to the base member 12. In this embodiment, the locking element 16 includes a plurality of discrete wedges 16 circumferentially disposed around the mounting bolt 14 and configured to abut a tapered profile 22 on the mounting bolt and a tapered profile 24 on the base member 12. The wedges 16 are biased radially inwardly toward the mounting bolt 14 by a plurality of wedge springs 26. The mounting bolt 14 includes a tool socket 28 configured to receive a hex wrench or similar tool. During installation of the mounting assembly 6, a hex wrench is inserted into the tool socket 28 and rotated to threadably draw the mounting bolt 14 toward the base member 12 thereby causing the tapered profiles 22 and 24 on the mounting bolt 14 and the base member 12, respectively, to displace wedges 16 radially outwardly against an inner surface of the handlebar 4 to fixedly secure the mounting assembly 6 to the handlebar 4. Alternative methods of attaching the brake lever assembly 2 to the end of the handlebar 4 may be used. Likewise, the brake lever assembly 2 need not be mounted to an end of a handlebar; it may alternatively be mounted to another portion of the handlebar, including extensions of the handlebar or "clip-ons" that permit a more aerodynamic riding position, or any other frame member of the bicycle. Additionally, the lever assembly 2 is not limited to use on a bicycle; it may alternatively be used on similar handlebar-steered vehicles.

Further in FIGS. 1-3, the cable adjuster 8 of this embodiment includes an adjuster housing 30 rotatably coupled to a bore 32 of the mounting assembly base member 12, and an adjuster bolt 34 threadably connected to the mounting bolt 14. Adjuster bolt 34 has a thru hole 36 drilled along its longitudinal axis, in this embodiment, coincident with an axis A of the handlebar 4. A head 38 of the adjuster bolt 34 has a square cross section when viewed along the handlebar axis A. A bore 40 of the adjuster housing 30 has a square cross section configured to matingly receive the square-shaped head 38 of the adjuster bolt 34. So configured, the adjuster bolt 34 rotates with the adjuster housing 30 about the handlebar axis A but is free to displace axially relative to the adjuster housing along axis A. A set screw 42 is threadably disposed in a threaded hole 44 in the base member 12 to fixedly engage a groove 46 in the adjuster housing 30. When set screw 42 is tightened against groove 46, adjuster housing 30 is prevented from moving both axially and rotationally thereby fixing adjuster housing 30 to the base member 12 and the handlebar 4. When set screw 42 is loosened slightly, the adjuster housing 30 may be adjusted rotatably but the sidewalls 48 of groove 46 will prevent substantial axial movement of adjuster housing 30 along the handlebar axis A.

Further in FIGS. 1-3, the brake lever 10 is rotatably attached to the adjuster housing 30 about the axis B by an axle 50 and includes a cable end cradle 52 and a finger grip 54 configured to be grasped by the rider's fingers. A cable assembly 56 includes a control cable 58 partially encased and slidably disposed in a control cable housing 60. The control cable 58 is received through the mounting assembly 6 and the cable adjuster 8, with a cable end 20 seated in the cable end cradle 52. In this embodiment, the control cable 58 is coaxially routed through a thru hole 62 in the mounting bolt 14 and the thru hole 36 in the adjuster bolt 34, with the cable end 20 seated in the cable end cradle 52, the cradle 52 rotatable with respect to the brake lever 10. The cable end cradle 52 and finger grip 54 are pivotably disposed with respect to the axle 50. The control cable housing 60 is received by the mounting assembly 6. In this embodiment, the control cable housing 60 is received coaxially within the thru hole 62 of the mounting bolt 14 and abuts a seat 64 formed within the thru hole 62, the control cable housing 60 partially encased by a ferrule 66 in the region of the thru hole 62.

Further in FIGS. 1-3, the brake lever assembly 2 is operable in two modes, cable adjustment and cable actuation. Under both modes, the brake lever 10 is operable to slidably displace the control cable 58 within the control cable housing 60. Under cable actuation, in this embodiment in order to brake, the rider grasps and displaces the finger grip 54 of the brake lever 10 to pivot the lever 10 about the axle 50 and axis B thereby causing the cradle 52 to pull the cable end 20 and slidably displace the control cable 58 within the control cable housing 60 under actuation to actuate a brake mechanism (not shown; typically, brake shoes frictionally engaging a wheel rim) to slow the bicycle. The cradle 52 rotates with respect to the brake lever 10 to avoid bending the cable end 20 under cable actuation. Under cable adjustment, in this embodiment to adjust the gap between the brake shoes and the wheel rim, the rider first slightly loosens the set screw 42 relative to the groove 46 of the adjuster housing 30. This frees adjuster housing 30 to be rotatable about handlebar axis A relative to the mounting assembly base member 12. The rider then rotates the brake lever 10, together with the adjuster housing 30 which is constrained to rotate with the brake lever, about handlebar axis A in a first direction. Rotation of the adjuster housing 30 in turn rotates the adjuster bolt 34 about the handlebar axis A and axially displaces the adjuster bolt along the handlebar axis as it threadably engages the mounting bolt 14. As the adjuster bolt 34 displaces axially, it urges and axially displaces the control cable housing 60 and ferrule 66 along the handlebar axis A. In doing so, the control cable 58 is slidably displaced within the control cable housing 60 to further axially distance the cable end 20 from the control cable housing 60 and ferrule 66 (from FIG. 2 to FIG. 3) thereby reducing the effective cable length and decreasing the gap between the brake shoes and the wheel rim. In order to increase the effective cable length, the rider rotates the lever 10 in a second direction about the handlebar axis A, opposite the first, to decrease the distance between the cable end 20 and the control cable housing 60 and ferrule 66 (from FIG. 3 to FIG. 2) thereby increasing the gap between the brake shoes and the wheel rim. When the rider has finished adjusting the effective cable length, he tightens the set screw 42 against the groove 46 of the adjuster housing 30 to rotatably fix the cable adjuster 8 to the mounting assembly 6. For a brake lever actuation device, the axial and rotational arrangement (in this embodiment, threadable) between the cable adjuster 8 and the mounting assembly 6 is configured to permit 360-degree increments of rotation of the brake lever 10 about the handlebar axis A from a preferred brake lever home position that enables the rider to ergonomically grasp and actuate the brake lever. In FIG. 2, the head 38 of adjuster bolt 34 is shown axially disposed against adjuster housing 30. In FIG. 3, the head 38 of adjuster bolt 34 is shown axially disposed against the mounting bolt 14. These represent the limits of axially adjustment of the adjuster bolt 34, in this embodiment. So configured, it is preferred to provide eight complete 360-degree revolutions of cable adjustment of the brake lever 10 about the handlebar axis A between the adjustment limits shown in FIGS. 2 and 3.

Figure 4:
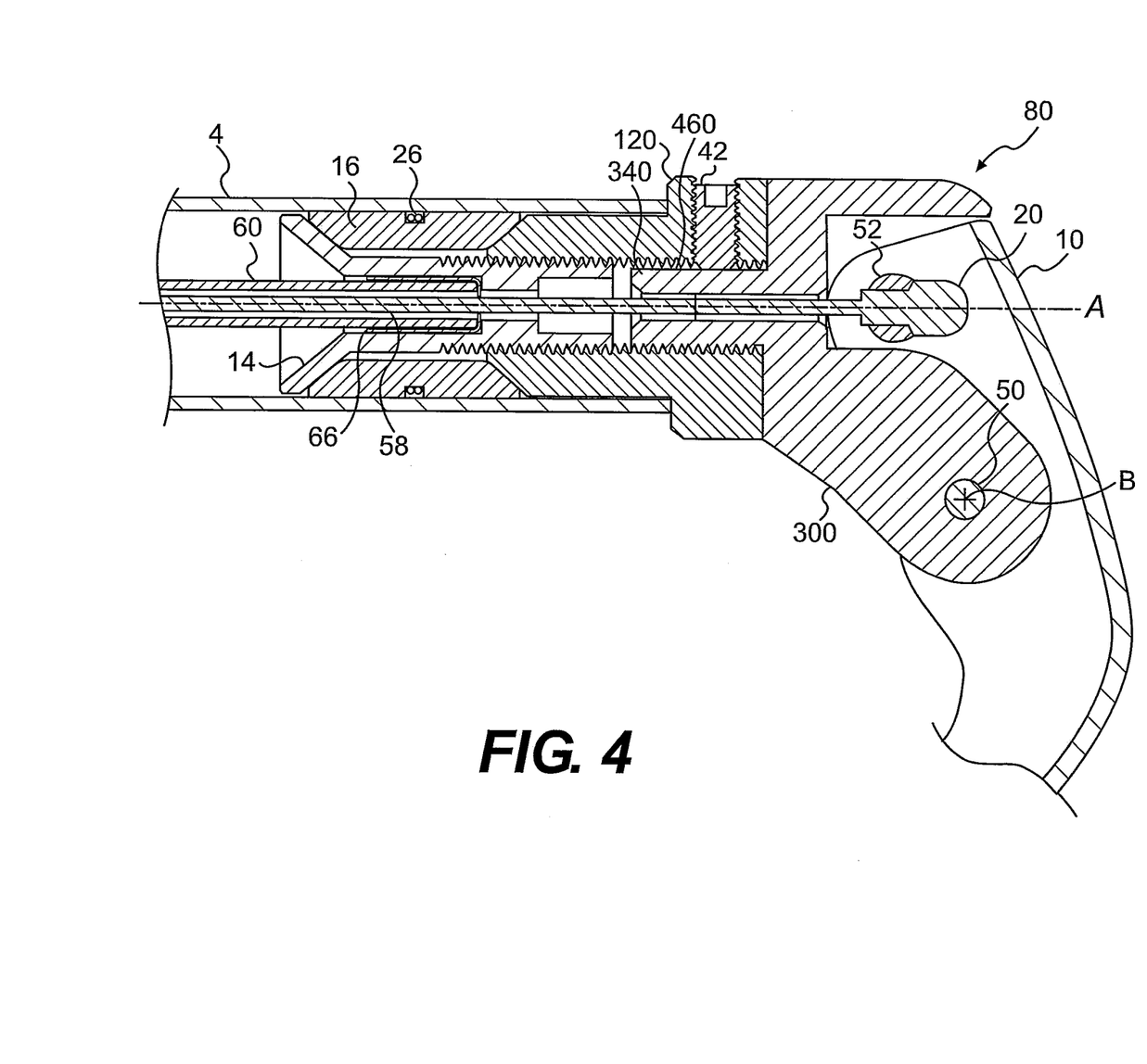
FIGS. 4 and 5 are cross-sectional views of a control cable actuation device according to another embodiment of the present invention in different cable adjustment positions.
Figure 5:
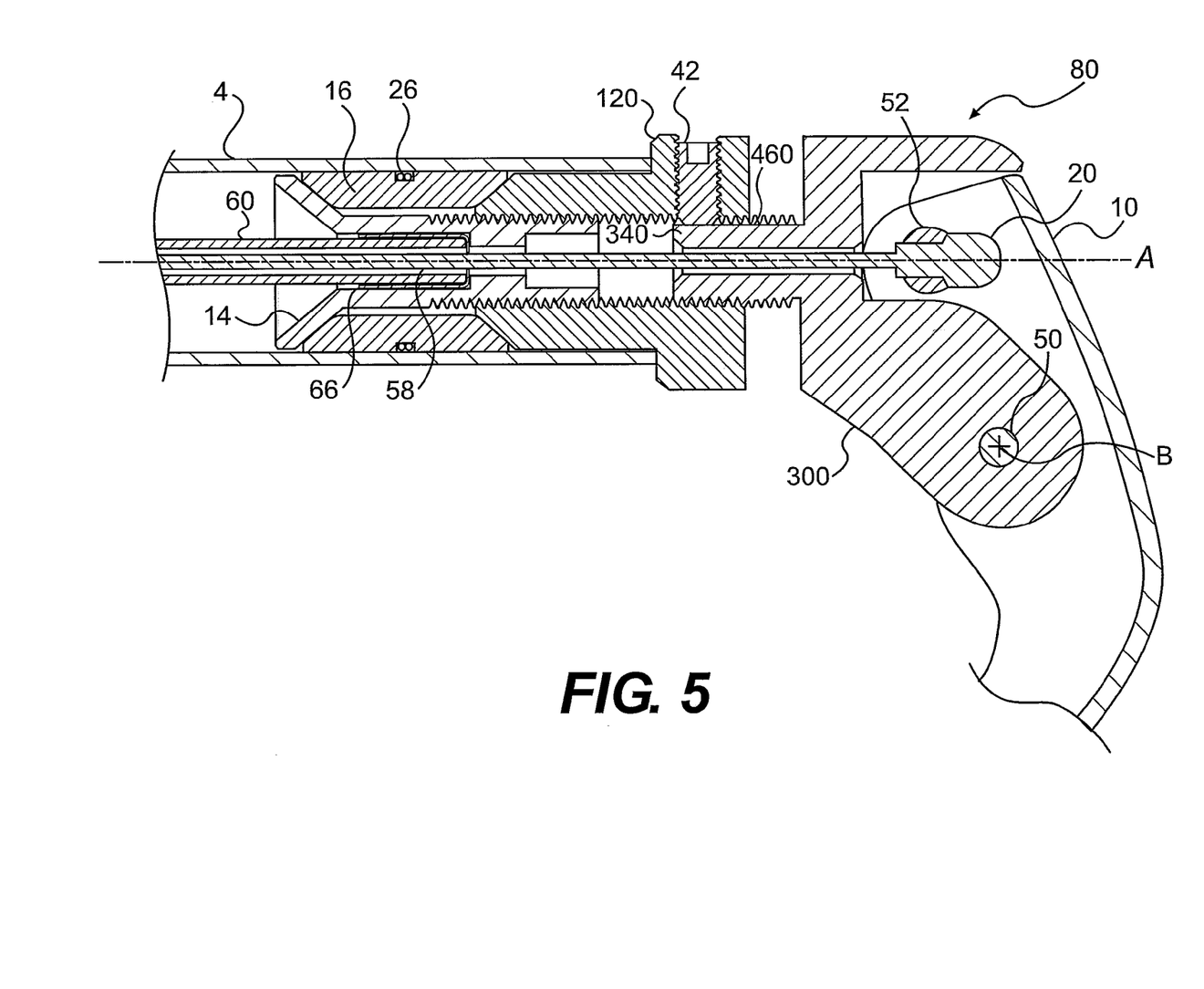

FIGS. 4-5 illustrate an additional embodiment of the invention where an adjuster housing 300 and an adjuster bolt 340 are embodied in a single-piece cable adjuster 80. The adjuster bolt 340 is now threadably coupled to a mounting assembly base member 120, not to the mounting bolt 14. So configured, upon rotation of the cable adjuster 80 about the handlebar axis A by the brake lever 10 under cable adjustment, the adjuster housing 300 both rotates about and displaces along the handlebar axis A, unlike the adjuster housing 30 of FIGS. 1-3 which only rotates. Accordingly, as the adjuster housing 300 is rotated by the brake lever 10 about handlebar axis A in the first direction under cable adjustment, the cable adjuster 80 axially displaces the cable end 20 to slidably displace the control cable 58 within the control cable housing 60 to further axially distance the cable end 20 from the control cable housing 60 and ferrule 66 (from FIG. 4 to FIG. 5) thereby reducing the effective cable length and decreasing the gap between the brake shoes and the wheel rim. To increase the effective cable length, the rider rotates the brake lever 10 in the second direction about the handlebar axis A, opposite the first, to decrease the distance between the cable end 20 and the control cable housing 60 and ferrule 66 (from FIG. 5 to FIG. 4) thereby increasing the gap between the brake shoes and the wheel rim. Further, in the embodiment of FIGS. 4-5, a longitudinal groove 460 in the adjuster housing 300, extending along the handlebar axis A, receives the set screw 42 to rotatably fix the cable adjuster 80 to the mounting assembly base member 120.

According to the invention, the packaging of the actuating lever 10 together with cable adjusters 8, 80 provides an aerodynamic profile and a clean aesthetic. Further, use of the actuation lever 10 for cable adjustment provides greater mechanical advantage, enabling quick and precise cable adjustments.

While this invention has been described by reference to one or more embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A control cable actuation device sized and shaped to attach to a handlebar-steered vehicle frame member for a cable assembly including a control cable slidably disposed within a control cable housing, the actuation device comprising:
    a base member shaped and sized to abuttingly and fixedly attach to an exterior end of the frame member;
    a cable adjuster rotatably attached to the base member such that when the cable adjuster is rotated relative to the base member to adjust the cable the base member remains abuttingly and fixedly attached to the frame member while the cable adjuster is rotated, the cable adjuster including:
    an adjuster housing configured to rotatably attach to the frame member about the second axis, and
    an adjuster bolt rotatably fixed to and protruding from the adjuster housing into the frame member to axially displace upon rotation of the adjuster housing about the second axis, the adjuster housing and adjuster bolt configured to receive the control cable; and
    an actuation lever rotatably attached to the cable adjuster about a first axis to slidably displace the cable within the cable housing under cable actuation, the lever rotating about a second axis to axially displace the cable adjuster relative to the base member under cable adjustment to slidably displace the cable within the cable housing under cable adjustment.

2. A control cable actuation device according to claim 1, wherein the cable adjuster rotates about the second axis to attach to an end of the frame member that is a handlebar, the second axis is an axis of the handlebar, the cable adjuster axially displaces along the second axis upon rotation of the cable adjuster, the control cable and control cable housing are disposed substantially coaxially within the handlebar.

3. A control cable actuation device according to claim 1, wherein the cable adjuster is configured to threadably attach to the frame member to be axially displaceable and configured to receive the control cable therethrough, the actuation lever including a cable end cradle disposed distally from the first axis to attach to the one end of the control cable thereto.

4. A control cable actuation device according to claim 3, wherein the frame member is a handlebar and the cable adjuster rotates about the second axis to an end of the handlebar, the second axis is an axis of the handlebar, the cable adjuster axially displaces along the second axis upon rotation of the cable adjuster, the control cable and control cable housing are disposed substantially coaxially within the handlebar.

5. A control cable actuation device according to claim 4 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

6. A control cable actuation device according to claim 3 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

7. A control cable actuation device according to claim 1, wherein the adjuster bolt is threadably attachable to the frame member to be axially displaceable, the adjuster housing and adjuster bolt configured to receive the control cable therethrough, the actuation lever including a cable end cradle disposed distally from the first axis for attachment of the one end of the control cable thereto.

8. A control cable actuation device according to claim 7, wherein the frame member is a handlebar and the cable adjuster rotates about the second axis to attach to an end of the handlebar, the second axis is an axis of the handlebar, the cable adjuster axially displaces along the second axis upon rotation of the cable adjuster, the control cable and control cable housing are disposed substantially coaxially within the handlebar.

9. A control cable actuation device according to claim 8 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

10. A control cable actuation device according to claim 7 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

11. A control cable actuation device according to claim 1, further comprising a mounting assembly configured to fixedly attach to the frame member and configured to receive the control cable and the control cable housing, the cable adjuster attached to the mounting assembly to be axially displaceable to slidably displace the cable within the cable housing under cable adjustment.

12. A control cable actuation device according to claim 11, wherein the cable adjuster axially displaces upon rotation about the second axis, the actuation lever rotates the cable adjuster about the second axis to slidably displace the cable within the cable housing under cable adjustment.

13. A control cable actuation device according to claim 12, wherein the frame member is a handlebar and the mounting assembly is configured to attach to an end of the handlebar, the second axis is an axis of the handlebar, the cable adjuster axially displaces along the second axis upon rotation of the cable adjuster, the control cable and control cable housing are disposed substantially coaxially within the handlebar.

14. A control cable actuation device according to claim 12, wherein the cable adjuster is configured to threadably attach to the mounting assembly to be axially displaceable along the second axis and configured to receive the control cable therethrough, the actuation lever including a cable end cradle disposed distally from the first axis for attachment of the one end of the control cable thereto.

15. A control cable actuation device according to claim 14, wherein the mounting assembly is configured to attach to an end of the frame member that is a handlebar, the second axis is an axis of the handlebar, the cable adjuster axially displaces along the second axis upon rotation of the cable adjuster, the control cable and control cable housing are disposed substantially coaxially within the handlebar.

16. A control cable actuation device according to claim 15, wherein the mounting assembly includes:
the base member;
a mounting bolt axially coupled to the base member; and
a locking element radially displacing to secure the mounting assembly to the handlebar as the mounting bolt is axially coupled to the base member, the mounting assembly disposed substantially within the handlebar.

17. A control cable actuation device according to claim 16, wherein the mounting bolt is threadably connected to the base member and the locking element is wedgeably displaced by the base member and mounting bolt.

18. A control cable actuation device according to claim 16, wherein the cable adjuster is threadably connected to one of the base member and the mounting bolt.

19. A control cable actuation device according to claim 15 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

20. A control cable actuation device according to claim 14 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

21. A control cable actuation device according to claim 11, wherein the adjuster bolt is threadably connected to the mounting assembly to be axially displaceable along the second axis, the adjuster housing and adjuster bolt configured to receive the control cable therethrough, the actuation lever including a cable end cradle disposed distally from the first axis for attachment of the one end of the control cable thereto.

22. A control cable actuation device according to claim 21, wherein the frame member is a handlebar and the mounting assembly is configured to attach to an end of the handlebar, the second axis is an axis of the handlebar, the cable adjuster axially displaces along the second axis upon rotation of the cable adjuster, the control cable and control cable housing are disposed substantially coaxially within the handlebar.

23. A control cable actuation device according to claim 22, wherein the mounting assembly includes:
the base member;
a mounting bolt axially coupled to the base member; and
a locking element that is radially displaced to secure the mounting assembly to the handlebar as the mounting bolt is axially coupled to the base member, the mounting assembly disposed substantially within the handlebar.

24. A control cable actuation device according to claim 23, wherein the mounting bolt is threadably connected to the base member and the locking element is wedgeably displaced by the base member and mounting bolt.

25. A control cable actuation device according to claim 22 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

26. A control cable actuation device according to claim 21 for actuating a brake device, wherein the actuation lever is a brake lever and includes a finger grip disposed in pivoting arrangement with the cable end cradle and the first axis, the lever rotatable in 360-degree increments about the second axis under cable adjustment from a lever home position.

\* \* \* \* \*